Nov. 24, 1964 R. J. PULKRABEK 3,158,847

TRANSDUCER

Filed March 14, 1962 2 Sheets-Sheet 1

INVENTOR.
RALPH J. PULKRABEK
BY
Carlson & Carlson
ATTORNEYS

INVENTOR.
RALPH J. PULKRABEK
BY
Carlson & Carlson
ATTORNEYS

United States Patent Office 3,158,847
Patented Nov. 24, 1964

3,158,847
TRANSDUCER

Ralph J. Pulkrabek, Minneapolis, Minn., assignor, by mesne assignments, to Data Products Corporation, Culver City, Calif., a corporation of Delaware Filed Mar. 14, 1962, Ser. No. 179,716
6 Claims. (Cl. 340—174.1)

This invention relates generally to transducers and is more particularly directed to transducers useful in providing information interchange between a moving storage medium and devices and apparatus for utilizing and generating such information.

An example of one application wherein the subject invention may be utilized is that concerned with the storing and retrieval of information utilized in the operation of the familiar computer in which an immense number of bits of information must be transferred to and from a storage medium. This, of necessity, has required the use of apparatus requiring dynamic interchange of information at a reasonably rapid rate. As a specific example, one form of equipment utilized for storage of information may be described as a disc file in which a plurality of discs of magnetizable storage medium are caused to rotate at relatively high speeds with accompanying high rotational and linear velocities. The greater the rate at which such information is dynamically interchanged, the greater the necessity for relatively close magnetic coupling between the information exchanging transducers and the magnetic storage medium.

Unfortunately, it is difficult to provide a magnetic medium for such storage which presents an absolutely smooth surface to any transducers which may be utilized for this purpose. This factor has resulted in the use of what may be described as the flying wing type of transducer in which the transducer is supported on top of a moving film of air associated with the motion of the storage medium. Generally speaking, the greater the motion the greater the distance the transducer will lie from the storage medium unless some biasing force is utilized to overcome some of the buoyant force from the moving film of air. In overcoming the buoyant force of the moving film of air, it will be appreciated that the distance between the surface of the transducer and that of the moving magnetic storage media becomes very small. In fact, it becomes less than the normal surface in perfections which are present in substantially all forms of magnetic storage medium.

Unless some means is provided for allowing the surface of the transducer to conform to the constantly changing surface of the magnetic storage media, severe damage due to actual physical contact between the transducer and the media results in rapid wear and deterioration, and in some cases, virtual destruction of the equipment.

One example of a transducer for use with moving magnetic storage media may be found in a certain co-pending patent application, Serial No. 142,793, filed October 4, 1961, in the names of Wallace W. Koskie, Donald K. Sampson and Byron D. Smith and assigned to the assignee of the present application.

The present invention overcomes a primary difficulty arising with the use of prior art devices and apparatus for the dynamic transfer of information. It has been discovered that a tri-axial degree of freedom of motion of the transducer surface to be positioned in proximity to the storage medium is unnecessary and that the combination of certain elements associated with the transducing apparatus which is the subject matter of the present invention results in an improved performance with regard to reliability and fidelity of transfer of information while allowing a substantial variation in manufacturing tolerances and providing a substantial decrease in cost relative to the improved response of the transducer to variations in the surface of the magnetic storage medium.

The combination of a plurality of pivot points positioned in suitable axial relationship with a transducer carrying member and the elimination of a substantial amount of inertial mass which accompanies such configuration, will, as described below, provide a vastly improved apparatus.

It is therefore an object of the present invention to provide an improved transducing apparatus for use in the dynamic interchange of information between input and output utilization devices and a storage medium.

It is a further object of the present invention to provide an improved transducer mounting which may be economically produced.

It is another object of the present invention to provide a high compliant transducer mounting for use with dynamic transfer of information for use with moving storage media.

These and other more detailed and specific objects will be disclosed in the course of the following specification, reference being had to the accompanying drawings, in which—

Figure 1:
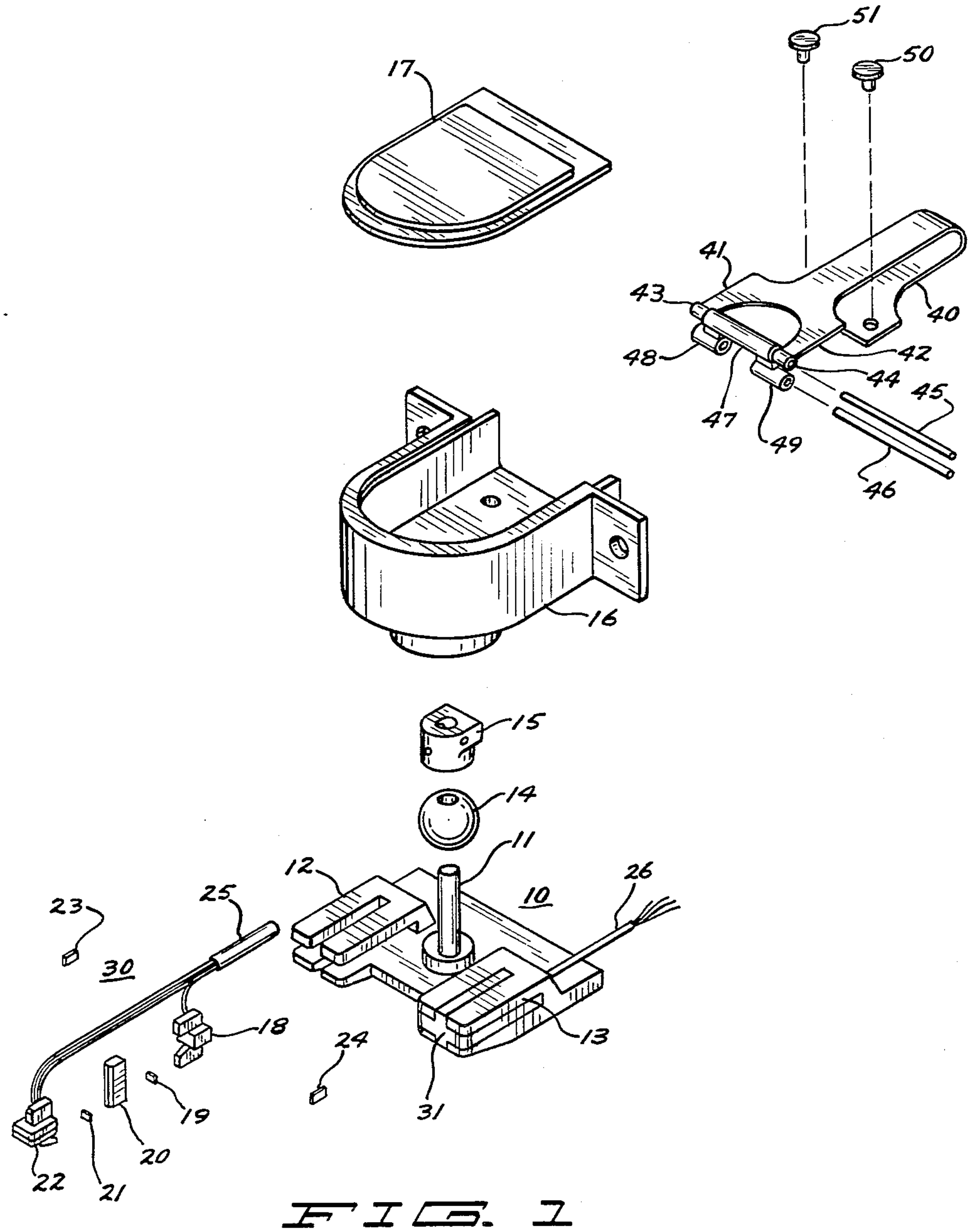
FIG. 1 is an exploded assembly diagram of a transducer apparatus.
Figure 2:
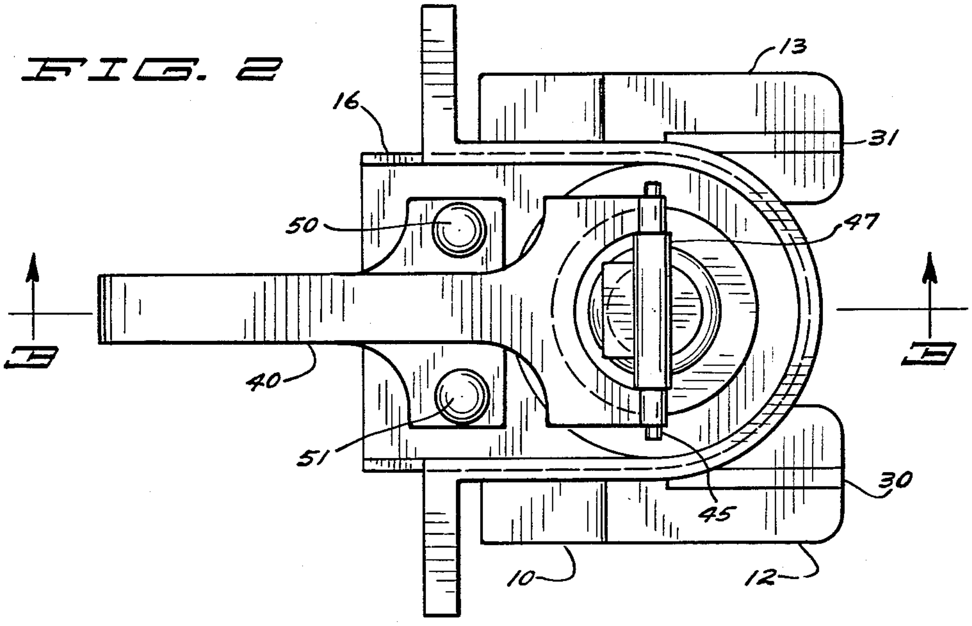
FIG. 2 is a top view with the cover plate removed.

Referring now to the drawings in which like elements are provided with like reference characters, there is shown a transducer carrying member assembly 10 having laterally disposed transducer carrying portions 12 and 13 into which transducer assemblies 30 and 31 are inserted and and securely held. A typical transducer assembly is indicated by reference numeral 30 includes an erase coil 18 having a suitable core and a pair of spacers 23 and 24 mounted on either side of the coil. A pole piece 20 is positioned intermediate a read-write coil 22 having appropriate core and is separated from the erase coil and read-write coil by spacer members 19 and 21. The transducer carrying member, which may also be described as a pad, is provided with a member 11 extending normal to the surface of the pad which is normally in proximity to the moving storage medium. A pivot ball 14 is placed on the member 11 and a further member 15, adapted to be connected to a connecting member (to be described below) is fixedly attached to member 11 through suitable attaching means (not shown). A spring biasing means 40 of substantially U-shape and having a bifurcated portion which is formed to accept a pin member 45 is attached to housing member 16 at the location shown through the use of rivets 50 and 51. A connector member which might also be considered as a spring linkage for connection between portion 15 on the transducer carrying member 10 and the bifurcated end of spring biasing means 40 is rotatably mounted and held in place by pins 45 and 46 associated with biasing means 40 and portion 15 respectively. A cover member 17 is provided to maintain a substantially fluid tight relationship with housing member 16. The completed assembly is mounted upon a movable arm which may be positioned with respect to a moving storage medium in accordance with a predetermined pattern according to the method of recording utilized insofar as the positioning of the information on the recording media is concerned.

Appropriate mounting holes are provided for the use of suitable fasteners and it is assumed that the arm for carrying the assembly has an aperture of suitable shape to coact with the end of housing 16 to provide a substantially fluid tight connection.

Figure 3:
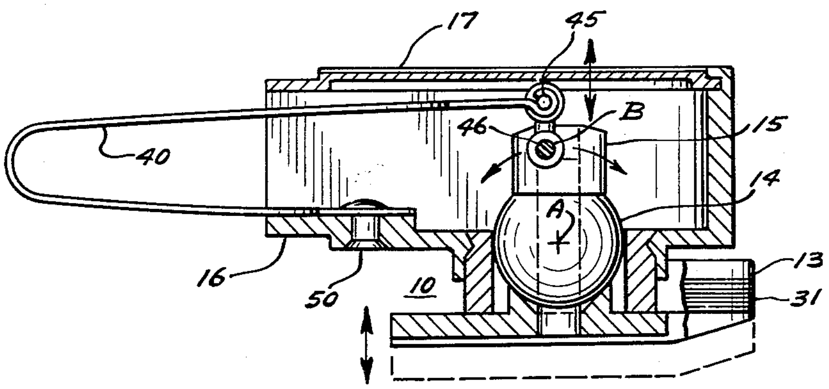
FIG. 3 is a sectional view taken along section lines 3—3 on FIG. 2.

As is more distinctly shown on FIG. 3, the transducer carrying member assembly 10 is mounted so as to provide reciprocating motion in an upward and downward direction and is further adapted to rotate about a first pivot point A with respect to the second pivot point shown on the ends of biasing means 40. The motion of the third pivot point B is described by the dotted arc. Shown in dotted outline is the extended information transferring position of assembly 10 when the interior of the housing has been connected to a suitable source of fluid under pressure. Suitable manufacturing tolerances are provided so that the diameter of the intermediate spherically shaped enlarged portion 14 will coact wtih the aperture in the housing in which it is mounted so as to allow a controlled amount of fluid to escape therebetween and provide lubrication for movement of one member with respect to another. The total amount of fluid pressure will be determined by the upward force exerted by biasing means 40. This may easily be determined and is controlled by the relative magnitudes of the forces involved. It may be recognized that the application of a compressible fluid under pressure results in a relatively constant spring rate with regard to the downward force applied to transducer member assembly 10 and that the assembly is able to move in a reciprocating upward and downward direction, with respect to the sense of the drawings, in a relatively free manner. Should the source of compressible fluid under pressure fail, it will be seen that the force exerted by spring member 40 is such that it will move the transducer carrying assembly 10 in an upward direction away from the moving storage medium.

An inspection of the manner in which the member 15 is connected to the biasing means 40 through connecting means 47 will show that the lateral rotational movement of the transducer carrying assembly 10 is constrained. Motion about a lateral horizontal axis is restrained by the bifurcated portions 41 and 42 at one extremity of the spring biasing means 40. It may also be noted that each of the bifurcated end portions 41 and 42 terminate in sockets 43 and 44 respectively for the insertion of mounting pin 45. Likewise, the connecting means 47 has a pair of journals 48 and 49 positioned for the reception of mounting pin 46 which also extends through the transverse opening in member 15. It is anticipated that the connecting member 47 will be constructed out of material having a low density or low inertial mass characteristic so as to allow free movement of transducer carrying assembly 10 about its pivot point A.

In operation, the transducer is energized from a suitable source of compressible fluid under pressure and is positioned at a desirable location with respect to a moving storage medium which may be assumed to move from left to right with respect to the cross sectional view of FIG. 3. Movement of the storage medium creates a boundary layer of air which serves to maintain transducer carrying member 10 at a small distance above the storage medium. Surface imperfections caused through manufacturing of the medium and possibly due to mechanical vibrations altering the shape of the medium under transient conditions are constantly encountered and it will be necessary for the transducer carrying member assembly 10 to rotate about point A and to move in a reciprocating upward and downward movement. The left edge of the transducer mounting assembly 10 will encounter an imperfection first and will tend to follow the boundary layer of air, or cushion, between it and the moving medium in an upward and downward direction and thereby cause pivoting about point A which in turn may move upwardly or downwardly as a result of the average of the imperfections encountered. Point B will move in an arc described by the dotted arrow and the connector means 47 will in turn pivot about pin 45 securely held at the one extremity of spring biasing means 40. It is therefore seen that aside from the mass of the transducer carrying member assembly 10, the inertia to be overcome exists only by virtue of the small connecting means which does not move an appreciable distance.

Thus through the combination of elements described above, the present invention provides a transducer of highly improved characteristics of operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for use in positioning transducers in information transferring relationship with a moving storage medium comprising; a housing member including an aperture and a means for supplying the interior of said housing with a compressible fluid under pressure; a transducer carrying member having a surface to be positioned in proximity to a moving storage medium and a further member extending normal to said surface, having an enlarged intermediate spherical portion substantially the size of said aperture for coacting with said aperture to provide a compressible fluid lubricated piston and pivot and having an end portion positioned within said housing; biasing means positioned within said housing for retracting said transducer carrying member in the absence of fluid under pressure, said biasing means including mounting means for rotatably engaging a connecting means along an axis normal to the axis of said further member; and connecting means interconnecting said biasing means and the end of said further member, said biasing means and said connecting means cooperating to allow reciprocating movement of said further means along its longitudinal axis and rotational motion about said spherical enlarged portion.

2. The apparatus of claim 1 in which the biasing means is a U-shaped spring in which said mounting means is formed at the ends of a bifurcated extremity.

3. In apparatus of the class above described, the combination comprising; a hollow housing including an aperture; a transducer mounting, including a longitudinally elongated member extending outwardly therefrom, positioned in said aperture and having an enlarged intermediate portion substantially the same size as said aperture, the center of said enlarged portion forming a first pivot for said transducer mounting; a second pivot mounted within said housing along the axis of said aperture; and connecting means connected to said second pivot and to a third pivot at the end of said elongated member whereby said third pivot point is rotatable about said first pivot and all of said pivots are movable longitudinally of the axis of said aperture.

4. The apparatus of claim 3 in which the second and third pivots cooperate with the connecting means to restrict rotational movement about one axis of movement of the transducer mounting.

5. The apparatus of claim 3 in which the connecting means is comprised of material having a high strength to mass ratio.

6. Apparatus for use with a moving storage medium comprising a hollow housing positionable in proximity to said moving storage medium, said housing having an aperture for receiving a transducer mounting member, said transducer mounting member including a rod extending from outside said housing through its aperture into said housing, a transducer mounted on the end of said rod external to said housing, a pivot ball having an opening therethrough, said pivot ball fitting over said rod and being dimensioned for slidably filling the opening in said housing, a terminating member attached to the other end of said rod with said housing and holding said pivot ball on said rod, a bifurcated spring means in said housing having one end attached to said housing wall, and means pivotably connecting the other end of said bifurcated spring means to said holding member.

References Cited in the file of this patent

UNITED STATES PATENTS 2,886,651 Vogel ------------------ May 12, 1959